(12) United States Patent
Strauss et al.

(10) Patent No.: US 11,367,550 B2
(45) Date of Patent: Jun. 21, 2022

(54) CIRCUIT SYSTEM AND METHOD FOR ENERGIZING AND DISCHARGING A COIL

(71) Applicant: Robert Bosch GmbH, Stuttgart (DE)

(72) Inventors: Klemens Strauss, Frammersbach (DE); Tobias Kirchner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 452 days.

(21) Appl. No.: 16/464,003

(22) PCT Filed: Dec. 8, 2017

(86) PCT No.: PCT/EP2017/081963
§ 371 (c)(1),
(2) Date: May 24, 2019

(87) PCT Pub. No.: WO2018/108725
PCT Pub. Date: Jun. 21, 2018

(65) Prior Publication Data
US 2020/0388423 A1 Dec. 10, 2020

(30) Foreign Application Priority Data
Dec. 12, 2016 (DE) .......................... 102016224675.5

(51) Int. Cl.
*H01F 7/06* (2006.01)
*F16K 31/06* (2006.01)

(52) U.S. Cl.
CPC ......... *H01F 7/064* (2013.01); *F16K 31/0675* (2013.01)

(58) Field of Classification Search
CPC .... H01F 7/1811; H01F 7/064; F16K 31/0675; G05F 1/468; G05F 1/56
(Continued)

(56) References Cited

U.S. PATENT DOCUMENTS 5,053,911 A * 10/1991 Kopec .................... H01H 47/04
361/154
9,692,293 B2 * 6/2017 Wu ......................... H02M 1/32
(Continued)

FOREIGN PATENT DOCUMENTS

DE 3232217 A1 3/1984
DE 3305674 A1 8/1984
(Continued)

OTHER PUBLICATIONS

International Search Report dated Apr. 24, 2018 of the corresponding International Application PCT/EP2017/081963 filed Dec. 8, 2017.

*Primary Examiner* — Kevin J Comber
(74) *Attorney, Agent, or Firm* — Norton Rose Fulbright US LLP; Gerard Messina

(57) ABSTRACT

A circuit includes a rectifier, e.g., including four diodes; a semiconductor switch; a coil that is chargeable, is dischargeable, and has (a) a first terminal connected to a first output terminal of the rectifier and (b) a second terminal connected via the semiconductor switch to a second output terminal of the rectifier; a first resistor via which a control terminal of the semiconductor switch is connected to the first output terminal of the rectifier; a second resistor connected between the second output terminal of the rectifier and the control terminal of the semiconductor switch; and a discharge unit connected between the second terminal of the coil and the control terminal of the semiconductor switch. The charging and discharging is implemented by, respectively, connecting both of, and disconnecting one or both of, first and second input terminals of the rectifier to/from the voltage source.

8 Claims, 4 Drawing Sheets

(58) Field of Classification Search
USPC .......................................................... 361/160
See application file for complete search history.

(56) References Cited

U.S. PATENT DOCUMENTS

2010/0097043 A1    4/2010  Kawashima
2014/0118874 A1*   5/2014  Kandah .............. H03K 17/0826
                                                      361/93.1

FOREIGN PATENT DOCUMENTS

| DE | 19648899 A1 | 5/1998 | |
| DE | 10158318 B4 | 11/2006 | |
| DE | 102006021847 A1 | 11/2007 | |
| EP | 3021444 A1 | 5/2016 | |
| JP | H0634322 A | 2/1994 | |
| JP | H0634322 U | 5/1994 | |
| WO | 9824105 A1 | 6/1998 | |
| WO | WO-2011108313 A1 * | 9/2011 | ............ H01F 7/1811 |

* cited by examiner

000# CIRCUIT SYSTEM AND METHOD FOR ENERGIZING AND DISCHARGING A COIL

CROSS-REFERENCE TO RELATED APPLICATIONS

The present application is the national stage of International Pat. App. No. PCT/EP2017/081963 filed Dec. 8, 2017, and claims priority under 35 U.S.C. § 119 to DE 10 2016 224 675.5, filed in the Federal Republic of Germany on Dec. 12, 2016, the content of each of which are incorporated herein by reference in their entireties.

FIELD OF THE INVENTION

The present invention relates to a circuit system and to a method for energizing and discharging a coil using a rectifier.

BACKGROUND

Coils or solenoid coils designed for AC voltage, for example with 220/230 V, can be also used as DC voltage magnets. For this purpose, a rectifier including usually four accordingly interconnected diodes can then be used to generate the required DC voltage from the AC voltage.

In the case of such coils, it can be necessary to quickly extinguish the current in the coil after energization, i.e., to quickly discharge the coil. A suppressor diode often used for this purpose when using a DC voltage source is of little help here since the discharge voltage is limited by the diodes in the rectifier, in general to 1.4 V, i.e., the voltage drop across two diodes connected in series. The current in the coil can thus only be reduced comparatively slowly.

It is possible to use conventional switch contacts for disconnecting the, usually low-resistance, rectifier from the coil in order to be able to connect a suppressor diode in the customary manner. Such switch contacts as mechanical components, however, are subject to a certain degree of wear.

Furthermore, thyristors or so-called triacs can be used. While the current can be interrupted using such components, this is only possible in a zero crossing. In the case of an AC voltage of 50 Hz and a use of ohmic loads, a shut-off is then only possible, for example, at intervals of 20 ms. Inductive loads cannot be shut off in this way since there is no zero crossing of the current.

A circuit system is known from DE 196 48 899 A1, for example, in which a field effect transistor, which interrupts the flow of current from the coil via the rectifier or its diodes when the AC voltage is shut off, is connected between the coil and the rectifier. Instead, the current then flows via a varistor connected in parallel to the coil. Comparable circuit systems are known from DE 33 05 674 A1 and DE 101 58 318 B4, for example.

SUMMARY

Example embodiments of the present invention are directed to a circuit system and a method for energizing and discharging a coil. According to an example embodiment of the present invention, a circuit system is used to energize and discharge a coil and includes a rectifier, including (e.g., four) rectifying elements, e.g., diodes, a first resistor (component), a semiconductor switch, e.g., a transistor, and the coil. In the rectifier, the rectifying elements can be interconnected in the usual manner in such a way that a positive voltage is always present on an output terminal of the rectifier, and accordingly a negative voltage is present on the other output terminal, regardless of the instantaneous polarity of the voltage present on the input terminals of the rectifier. The rectifier is now connectable to an AC voltage source via a first input terminal and a second input terminal. A first terminal of the coil is connected to a first output terminal of the rectifier, and a second terminal of the coil is connected via the semiconductor switch to a second output terminal of the rectifier. A control terminal of the semiconductor switch, which in the case of a preferably used MOSFET is a gate terminal, is now connected via the first resistor to the first output terminal of the rectifier. In this way, a voltage can be appropriately applied to the control terminal of the transistor during energization of the coil, so that the transistor is switched to a conducting state, which is necessary for energizing the coil using the present circuit system.

Furthermore, a discharge unit, which is connected between the second terminal of the coil and the control terminal of the semiconductor switch, and a second resistor (component), which is connected between the second output terminal of the rectifier and the control terminal of the semiconductor switch, are now provided. If the voltage source is now disconnected from the rectifier, initially the activation of the semiconductor switch via the control terminal and the first resistor is dispensed with. The semiconductor switch can thus initially no longer be permanently conducting in a low-resistance manner. An induction voltage (self-induction) builds up at the coil, which is opposed to the original voltage. Corresponding to the selected charging unit and a threshold voltage of the semiconductor switch, a potential is then induced at the second terminal of the coil. Correspondingly, a voltage is also induced at the second resistor, and thus at the control terminal of the semiconductor switch. The semiconductor switch thus becomes conducting again, but not in the same low-resistance manner as would be the case if the voltage were supplied via the rectifier. Rather, the extinction voltage is induced across the semiconductor switch. With this, the extinction current flows through the semiconductor switch, via which the energy stored in the coil is reduced during this voltage drop. In this way, a majority, in particular more than 90% or more than 99%, of the energy stored in the coil can be reduced via the semiconductor switch. This semiconductor switch thus assumes the task of an otherwise customary suppressor diode.

Preferably, the discharge unit includes at least one first Zener diode having an inverse direction from the second terminal of the coil in the direction of the control terminal of the semiconductor switch. A suitable resistor (component) is also possible, which is connected in series to the at least one first Zener diode. In this way, it is possible to achieve that the voltage drop across the semiconductor switch is adjusted just to the breakdown voltage of the at least one first Zener diode. In this regard it is also advantageous when a breakdown voltage of the at least one first Zener diode is less than a predefined voltage which drops across the semiconductor switch or, in particular, is permissible for the semiconductor switch. Even though it is possible to use a single first Zener diode, it is also possible, in particular for cost reasons, to use multiple—series-connected—first Zener diodes. The breakdown voltages of the individual first Zener diodes are then added up. For example, in an example embodiment, four first Zener diodes are provided, each having a 100 V breakdown voltage, i.e., a total breakdown voltage of 400 V, at a permissible drain-source voltage of 500 V for one MOSFET.

As a further option, it is preferred when the discharge unit includes at least one third resistor (component). In this case, the voltage present on the control terminal can be established via a ratio of the resistance value of the second resistor to the resistance value of the third resistor. For example, several megaohms are possible here as a resistance value for the third resistor.

As yet another option, it is preferred when the discharge unit includes a series connection with a fourth resistor (component) and a diode having a conducting direction from the second terminal of the coil in the direction of the control terminal of the semiconductor switch, furthermore a fifth resistor (component) being provided, which is connected between a terminal situated between the fourth resistor and the diode and the second output terminal of the rectifier. In this way, the current of the coil flows not only across the fourth resistor (as part of the discharge unit), but also across the fifth and then also across the second resistor, after the AC voltage source has been disconnected from the rectifier. A voltage present on the control terminal is thus decisively determined by a ratio of the value of the fifth resistor to the value of the fourth resistor. As a result of the diode, it can furthermore be prevented that current flows across the fifth resistor during the energization of the coil.

Preferably, the circuit system furthermore includes a capacitor, which is connected between the second output terminal of the rectifier and the control terminal of the semiconductor switch. The capacitor is thus, in particular, in parallel to the second resistor. As a result of such a capacitor, it is possible to smooth the voltage present on the control terminal of the semiconductor switch during the energization of the coil, the voltage in general only being present in the form of sine half waves due to the rectifier. Moreover, a permanent supply of the control terminal with a voltage is thus ensured.

Advantageously, the circuit system furthermore includes a second Zener diode connected in the conducting direction between the second output terminal of the rectifier and the control terminal of the semiconductor switch. The second Zener diode is thus, in particular, in parallel to the second resistor. As a result of such a second Zener diode, it is possible to limit the voltage present at the control terminal of the semiconductor switch during the energization of the coil. For example, a value of 10 V is possible as a breakdown voltage for this second Zener diode.

Preferably, the first output terminal of the rectifier is designed as a positive terminal, and the second output terminal of the rectifier is designed as a negative terminal. As an alternative, the first output terminal of the rectifier can be designed as a negative terminal, and the second output terminal of the rectifier can be designed as a positive terminal. The terminals of the remaining components of the circuit system can then be aligned accordingly. In the first variant, in particular an N-channel MOSFET can be used as the semiconductor switch, and a P-channel MOSFET can be used in the second variant.

The coil can preferably be designed as part of a solenoid valve. Rapid discharging of the coil is often desired especially in the case of solenoid valves to be able to carry out fast switching processes.

A method according to the present invention is used to energize and discharge a coil and uses a circuit according to the present invention in the process. For energizing the coil, the rectifier is connected to an AC voltage source via the first input terminal and the second input terminal. For discharging the coil, the first input terminal and/or the second input terminal of the rectifier are then disconnected from the AC voltage source. The energization and discharge of the coil are preferably carried out during an operation of a solenoid valve, the coil being designed as a part thereof.

With respect to advantages of the method according to the present invention, reference is made to above statements on the circuit system according to the present invention to avoid repetitions. Further advantages and embodiments of the present invention are derived from the description and the accompanying drawings.

The present invention is schematically shown based on example embodiments in the drawings and is described hereafter with reference to the drawings.

DETAILED DESCRIPTION

Figure 1:
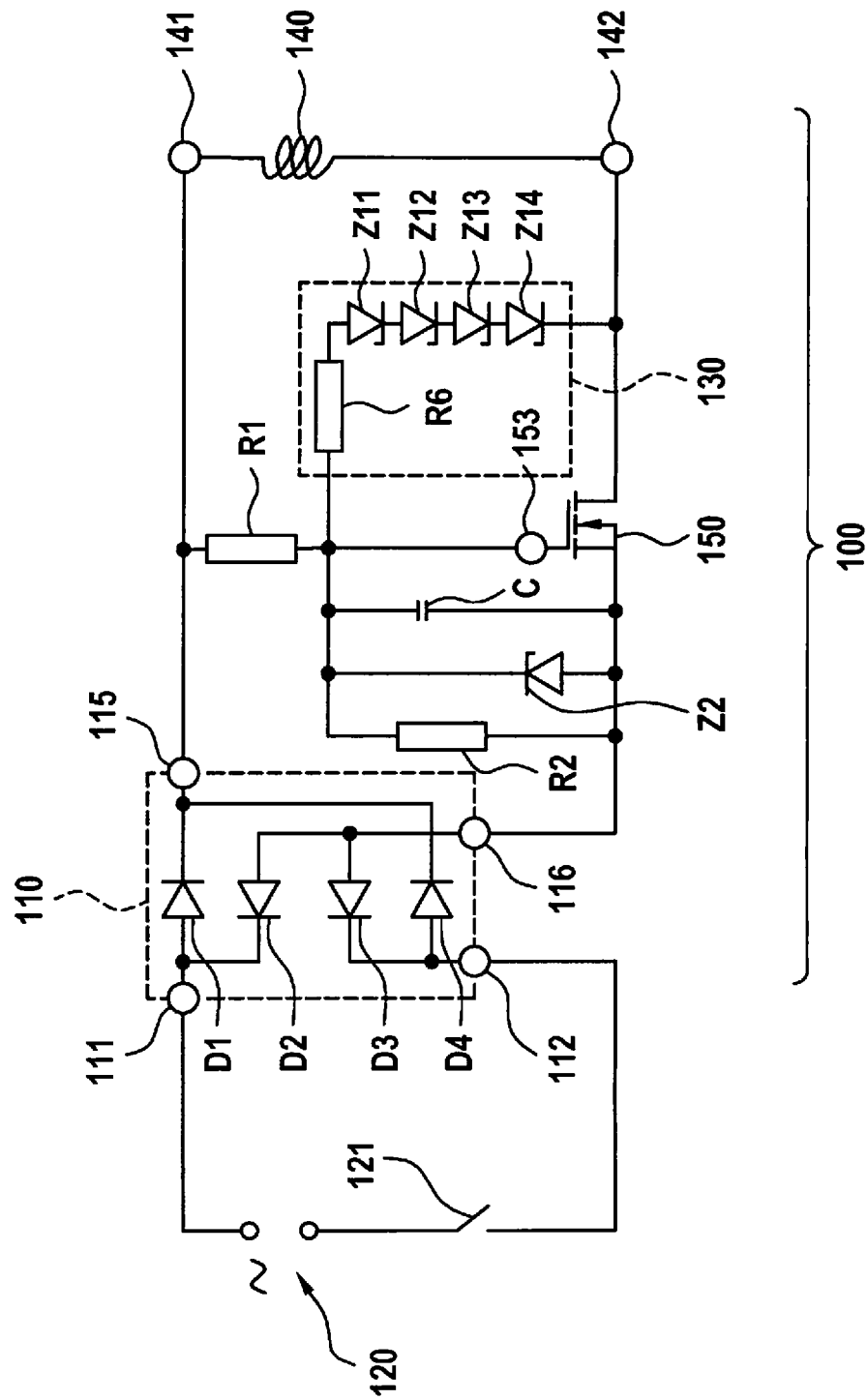
FIG. 1 schematically shows a circuit system according to an example embodiment of the present invention.

FIG. 1 schematically shows a circuit system according to an example embodiment of the present invention. Circuit system 100 includes a rectifier 110, which is connectable, and also connected here, to an AC voltage source 120 via a first input terminal 111 and a second input terminal 112. The AC voltage source can be disconnected from rectifier 110 here by way of example using a switch element 121. AC voltage source 120 can provide a voltage of 230 V, for example.

Rectifier 110 includes four diodes D1, D2, D3 and D4 arranged, by way of example, in such a way that a positive voltage is always present on a first output terminal 115 of rectifier 110, whereas a negative voltage is always present on a second output terminal 116 of rectifier 110.

Furthermore, circuit system 100 includes a coil 140, which is connected via a first terminal 141 to first output terminal 115 of rectifier 110. Coil 140 is connected via a second terminal 142 to a semiconductor switch 150, and semiconductor switch 150 is connected to second output terminal 116 of rectifier 110. In other words, second terminal 142 of coil 140 is connected via semiconductor switch 150 to second output terminal 116 of rectifier 110.

Semiconductor switch 150 is, for example, an enhancement-type N-channel MOSFET including a control terminal 153 designed as a gate terminal. Control terminal 153 of semiconductor switch 150 is connected via a first resistor R1 to first output terminal 115 of rectifier 110.

Furthermore, circuit system 100 includes a second resistor R2, a second Zener diode Z2, and a capacitor C, each of which is connected to second output terminal 116 of rectifier 110 and to control terminal 153 of semiconductor switch 150. As a result, these components are also connected in parallel among one another. Second Zener diode Z2 is connected in such a way that the conducting direction is present from second output terminal 116 of rectifier 110 in the direction of control terminal 153 of semiconductor switch 150. Accordingly, the situation is converse with the inverse direction of second Zener diode Z2.

Furthermore, a discharge unit 130 is connected between second terminal 142 of coil 140 and control terminal 153 of semiconductor switch 150. In the illustrated example embodiment, discharge unit 130 includes four first Zener diodes Z11, Z12, Z13 and Z14 connected in series, and a resistor R6 furthermore connected in series thereto. An inverse direction of the first Zener diodes is present from second terminal 142 of coil 140 in the direction of control terminal 153 of semiconductor switch 150.

If circuit system 100 is now used to energize coil 140, switch 121 can be closed. Via first output terminal 115 of rectifier 110, a voltage is applied to control terminal 153 of semiconductor switch 150 or between control terminal 153 and a source terminal of semiconductor switch 150, which is the rectifier-side terminal of semiconductor switch 150. In this way, semiconductor switch 150 becomes conducting, and current is able to flow through coil 140.

Capacitor C ensures that a voltage is continuously present at control terminal 153, since the voltage provided at first output terminal 115 of rectifier 110 is generally only present in the form of positive sine half waves. Second Zener diode Z2, in contrast, ensures a voltage limitation at control terminal 153. The breakdown voltage of second Zener diode Z2 can be 10 V for this purpose, for example.

If AC voltage source 120 is disconnected from rectifier 110 by opening of switch element 121, capacitor C initially discharges via second resistor R2. Semiconductor switch 150 thus becomes high-resistance, and an induction voltage at the drain terminal of semiconductor switch 150, which is the coil-side terminal of semiconductor switch 150 here, immediately begins to rise steeply.

As soon as this voltage reaches a value which is higher than the breakdown voltage of the four first Zener diodes Z11, Z12, Z13 and Z14 and the threshold voltage of the semiconductor switch, control terminal 153 of semiconductor switch 150 is supplied with voltage. The semiconductor switch thus becomes conductive again, and the voltage dropping across the semiconductor switch, i.e., the source-drain voltage, adjusts to the value of the breakdown voltage of the first Zener diodes. With it, an extinction current flows through the semiconductor switch.

This voltage should be set in such a way that a predefined or permissible source-drain voltage is not exceeded. The value can be 400 V, for example, when a 500 V MOSFET is used as the semiconductor switch. The chain of the first Zener diodes can also be replaced with a single Zener diode. However, in general a series connection made up of multiple 100 V Zener diodes is more cost-effective.

As was already mentioned at the outset, the polarity of circuit system 100, and in particular of rectifier 110, can also be reversed, for example then using a P-channel MOSFET as semiconductor switch 150 and with appropriate adaptation of the remaining components.

Figure 2:
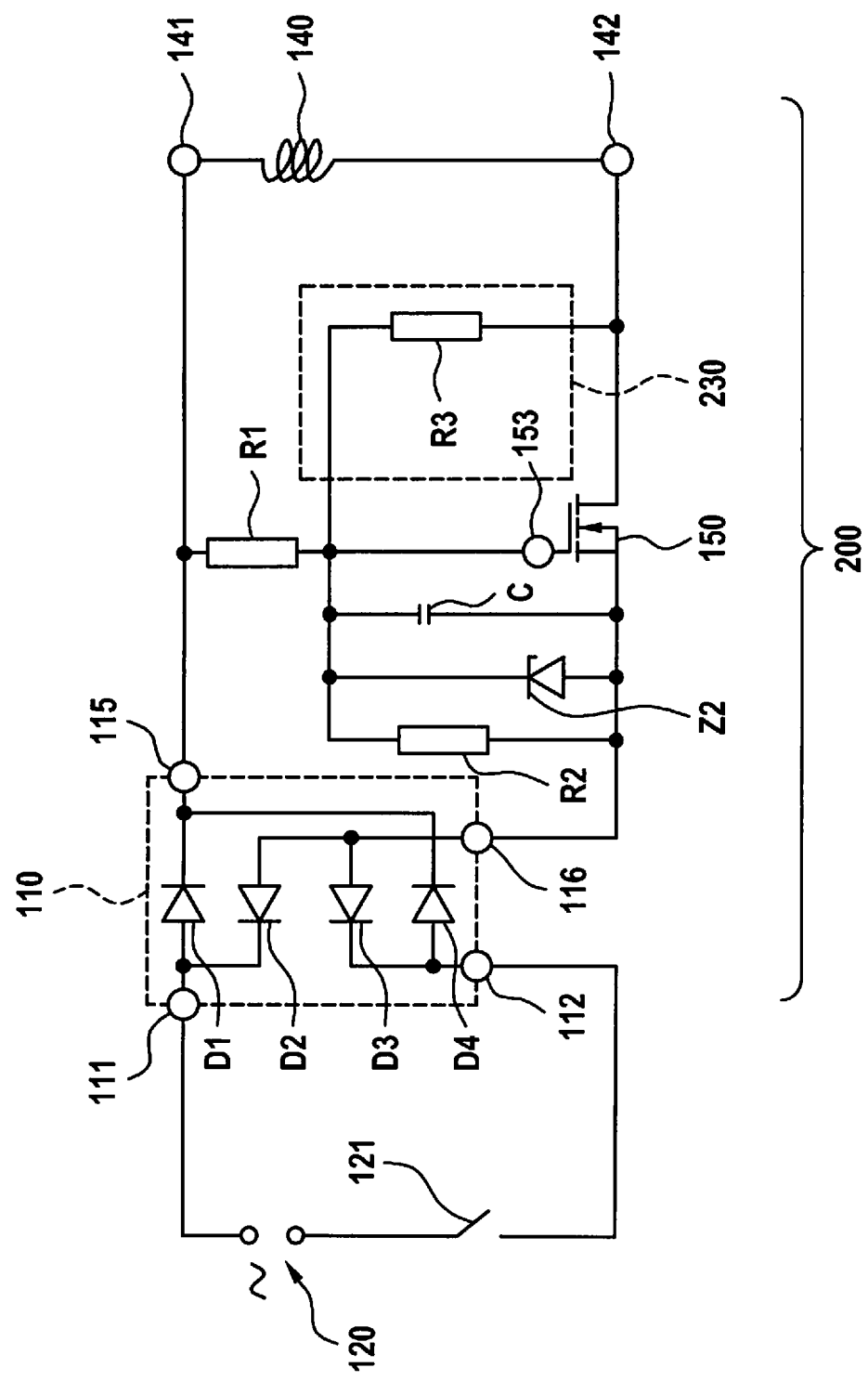
FIG. 2 schematically shows a circuit system according to another example embodiment of the present invention.

FIG. 2 schematically shows a circuit system according to another example embodiment of the present invention. Circuit system 200 essentially corresponds to circuit system 100, so that reference is made to the description there for this purpose. Identical elements are denoted by identical reference numerals. In contrast to circuit system 100, however, a different discharge unit 230, which includes a third resistor R3 here, is provided in circuit system 200. Third resistor R3 can have a value of several MΩ; for example, 3.3 MΩ is conceivable. The values of first and second resistors R1 and R2 can then be 220 kΩ and 50 kΩ, for example. The voltage at control terminal 153 is now determined here by the ratio of the values of third and second resistors R3 and R2.

Figure 3:
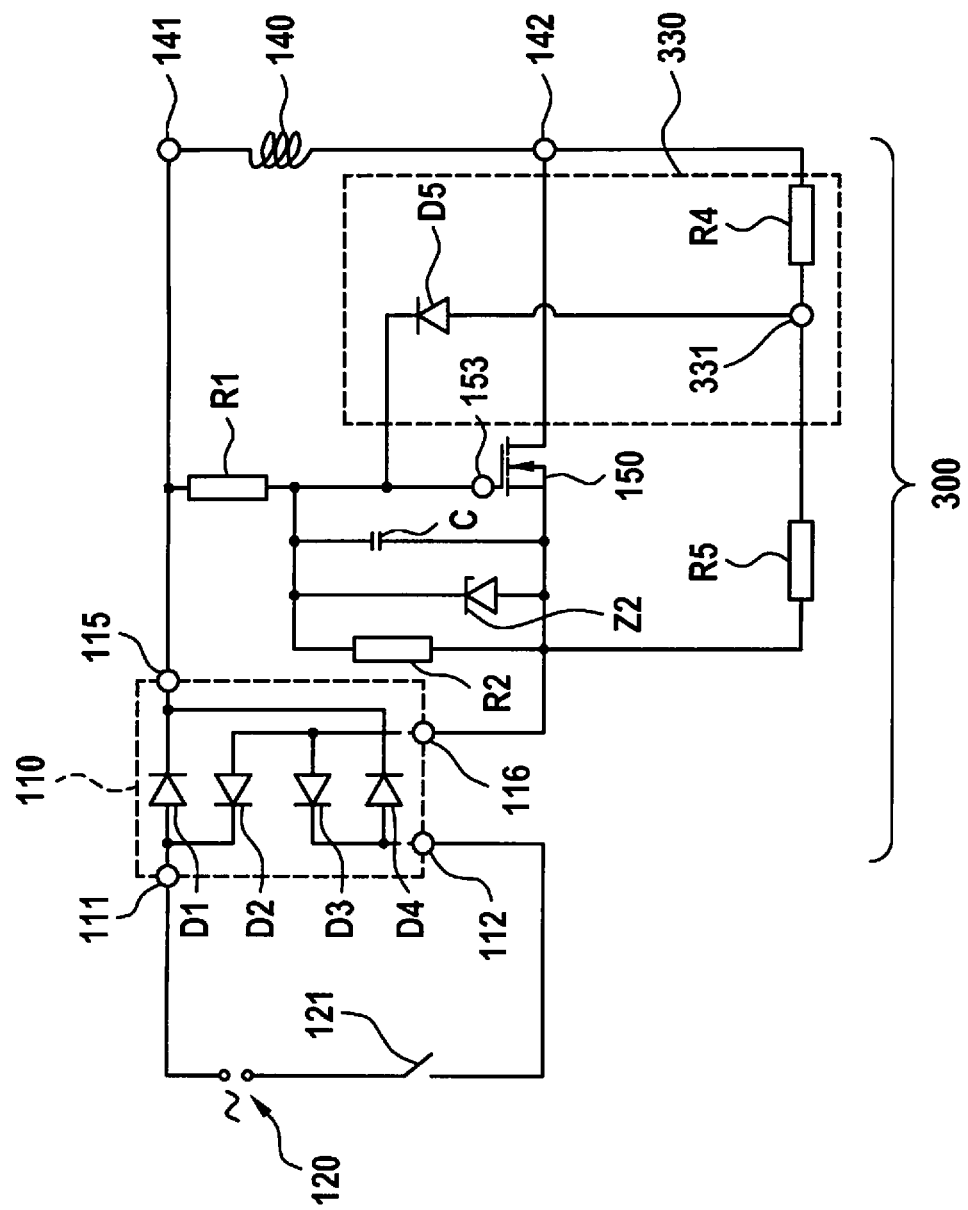
FIG. 3 schematically shows a circuit system according to another example embodiment of the present invention.

FIG. 3 schematically shows a circuit system according to another example embodiment of the present invention. Circuit system 300 essentially corresponds to circuit system 100, so that reference is made to the description there for this purpose. Identical elements are denoted by identical reference numerals. In contrast to circuit system 100, however, a different discharge unit 330, which includes a fourth resistor R4 and a diode D5 here, is provided in circuit system 300. A conducting direction of diode D5 is present from second terminal 142 of coil 140 in the direction of control terminal 153 of semiconductor switch 150.

Moreover, a fifth resistor R5 is provided, which is connected between a terminal 331 situated between fourth resistor R4 and diode D5 and second output terminal 116 of rectifier 110. By using diode D5, the voltage divider made up of fifth and fourth resistor R5 and R4 now becomes lower resistance, while a voltage, however, is provided at control terminal 153 during the discharging of the coil.

Figure 4:
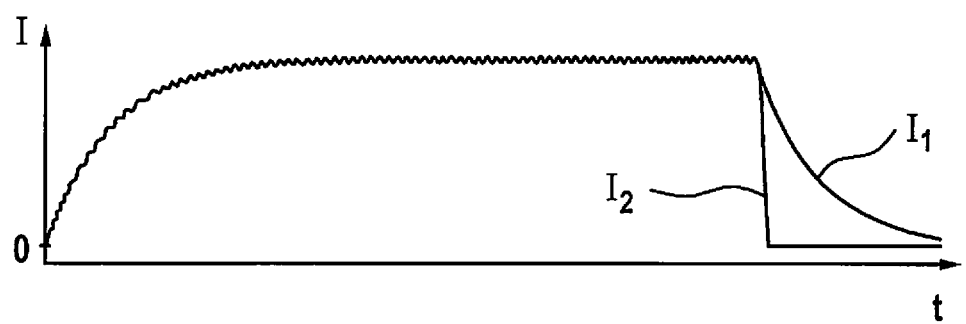
FIG. 4 schematically shows a current curve when using a method according to an example embodiment of the present invention compared to a method not according to the present invention.

FIG. 4 schematically shows a current curve when using a method according to the present invention in an example embodiment compared to a method not according to the present invention. For this purpose, a current I is plotted against time t.

Initially, a start of the energization of the coil is apparent here. The current rises slowly. During the energization, the current then remains constant, at least on average.

Furthermore, a discharge is shown. $I_1$ shows a curve as it occurs without the use of a circuit system according to the present invention when the coil is only being discharged via two diodes of the rectifier. The current decreases comparatively slowly here.

$I_2$ shows a curve when using one of the circuit systems, for example, as they were described with respect to FIGS. 1-3. It is apparent here that the current drops considerably more quickly due to the corresponding circuit system, since it is not limited by the maximum voltage drop across the diodes of the rectifier. The illustration of curve $I_2$ is schematic, and the actual curve cvary, depending on the specific configuration of the circuit system.

What is claimed is:

1. A circuit comprising:
   a rectifier that is connectable via a first input terminal and a second input terminal to an AC voltage source;
   a semiconductor switch;
   a coil that is chargeable, is dischargeable, and has (a) a first terminal connected to a first output terminal of the rectifier and (b) a second terminal connected via the semiconductor switch to a second output terminal of the rectifier;
   a first resistor via which a control terminal of the semiconductor switch is connected to the first output terminal of the rectifier;
   a second resistor connected between the second output terminal of the rectifier and the control terminal of the semiconductor switch; and
   a discharge unit connected between the second terminal of the coil and the control terminal of the semiconductor switch,
   discharging the coil by disconnecting one or both of the first and second input terminals of the rectifier from the AC voltage source,
   wherein the discharge unit includes at least one first Zener diode having an inverse direction from the second terminal of the coil in a direction of the control terminal of the semiconductor switch, wherein a breakdown voltage of the at least one first Zener diode is lower than a predefined voltage that drops across the semiconductor switch, wherein an induction voltage is configured to build up at the coil, the second resistor, and the control terminal of the semiconductor switch, and wherein energy stored in the coil is reduced via the semiconductor switch, wherein the discharge unit includes at least one third resistor, wherein the coil is part of a solenoid valve, wherein the at least one third resistor is in series with the at least one first Zener diode.

2. The circuit of claim 1, further comprising a capacitor connected between the second output terminal of the rectifier and the control terminal of the semiconductor switch.

3. The circuit of claim 1, further comprising a Zener diode connected in a conducting direction between the second output terminal of the rectifier and the control terminal of the semiconductor switch.

4. The circuit of claim 1, wherein the semiconductor switch is a MOSFET.

5. The circuit of claim 1, wherein the first output terminal of the rectifier is a positive terminal, and the second output terminal of the rectifier is a negative terminal.

6. The circuit of claim 1, wherein the first output terminal of the rectifier is a negative terminal and the second output terminal of the rectifier is a positive terminal.

7. A method for a circuit that includes a rectifier, a semiconductor switch, a coil that has (a) a first terminal connected to a first output terminal of the rectifier and (b) a second terminal connected via the semiconductor switch to a second output terminal of the rectifier, a first resistor via which a control terminal of the semiconductor switch is connected to the first output terminal of the rectifier, a second resistor connected between the second output terminal of the rectifier and the control terminal of the semiconductor switch, and a discharge unit connected between the second terminal of the coil and the control terminal of the semiconductor switch, the method comprising:

energizing the coil by connecting the rectifier via first and second input terminals of the rectifier to an AC voltage source; and discharging the coil by disconnecting one or both of the first and second input terminals of the rectifier from the AC voltage source, wherein an induction voltage is configured to build up at the coil, the second resistor, and the control terminal of the semiconductor switch, and wherein energy stored in the coil is reduced via the semiconductor switch, wherein the discharge unit includes at least one third resistor, wherein the coil is part of a solenoid valve, wherein the at least one third resistor is in series with at least one first Zener diode.

8. The method of claim 7, wherein the energizing and discharging are carried out during an operation of the solenoid valve.

* * * * *